(12) United States Patent
Ball et al.

(10) Patent No.: US 8,167,730 B2
(45) Date of Patent: May 1, 2012

(54) TUNED ABSORBER

(75) Inventors: Arthur Ball, Oxford, MI (US); Crittenden A Bittick, Rochester Hills, MI (US); Craig A Campbell, West Bloomfield, MI (US)

(73) Assignee: GKN Driveline North America, Inc., Auburn Hills, MI (US)

(*) Notice: Subject to any disclaimer, the term of this patent is extended or adjusted under 35 U.S.C. 154(b) by 289 days.

(21) Appl. No.: 12/563,518

(22) Filed: Sep. 21, 2009

(65) Prior Publication Data

US 2011/0070957 A1 Mar. 24, 2011

(51) Int. Cl.
*F16C 3/02* (2006.01)
(52) U.S. Cl. ........................................ 464/180
(58) Field of Classification Search .............. 464/127, 464/180; 188/378–380; 180/381
See application file for complete search history.

(56) References Cited

U.S. PATENT DOCUMENTS

| | | | |
|---|---|---|---|
| 4,739,702 A * | 4/1988 | Kobler | 464/180 |
| 4,826,145 A * | 5/1989 | Moore et al. | |
| 4,909,361 A * | 3/1990 | Stark et al. | 464/180 |
| 5,326,324 A * | 7/1994 | Hamada | 464/180 |
| 5,839,961 A * | 11/1998 | Andress | 464/180 |
| 6,312,340 B1 * | 11/2001 | Gassen et al. | 464/180 |
| 6,623,365 B1 * | 9/2003 | Maretzke et al. | 464/180 |
| 6,837,345 B1 * | 1/2005 | Lauble et al. | 464/180 |
| 7,044,276 B2 * | 5/2006 | Haneishi et al. | 464/180 |
| 7,416,491 B2 | 8/2008 | Campbell et al. | |
| 2005/0121896 A1 * | 6/2005 | Bonhard et al. | |
| 2007/0087848 A1 * | 4/2007 | Larsen et al. | 464/180 |
| 2007/0204453 A1 * | 9/2007 | Sun et al. | |
| 2009/0062023 A1 * | 3/2009 | Habara | 464/180 |

* cited by examiner

*Primary Examiner* — Gregory Binda
*Assistant Examiner* — Josh Skroupa
(74) *Attorney, Agent, or Firm* — Jennifer M. Brumbaugh; Mick A. Nylander; Rader, Fishman & Grauer PLLC

(57) ABSTRACT

A shaft assembly includes a shaft member having an inside surface and defined by an axis, an absorber assembly disposed within the shaft member and including a cantilever device spacing a mass member away from a base and including damping material disposed around the cantilever device.

17 Claims, 9 Drawing Sheets

TUNED ABSORBER

TECHNICAL FIELD

The disclosure generally relates to vibrational energy absorption in drive shafts.

BACKGROUND

There are generally four types of automotive driveline systems. More specifically, there exists a full-time front wheel drive system, a full-time rear wheel drive system, a part-time four-wheel drive system and an all-wheel drive system. Most commonly, the systems are distinguished by the delivery of power to different combinations of drive wheels, i.e., front drive wheels, rear drive wheels or some combination thereof. In addition to delivering power to a particular combination of drive wheels, most drive systems permit the respective driven wheels to rotate at different speeds. For example, when turning, the outside wheels generally rotate faster than the inside wheels and the front wheels generally rotate faster than the rear wheels.

Driveline systems also include one or more constant velocity joints (CVJ). Such joints, which include by way of example and not limitation, the plunging tripod type, a high speed fixed type, along with any other known types are well known to those skilled in the art and are employed where transmission of a constant velocity rotary motion is desired. A typical driveline system for a rear wheel or all-wheel drive vehicle, for example, incorporates one or more constant velocity joints to connect a pair of front and rear propeller shafts (propshafts). The propshafts transfer torque from a power take-off unit generally located about a front axle of the vehicle to a rear driveline module generally located about a rear axle of the vehicle. Similarly, a driveline system for a front wheel drive vehicle incorporates one or more constant velocity joints to transfer torque from the power take-off unit to the propshaft(s).

At certain rotational speeds and resonant frequencies the above referenced propshafts typically exhibit unbalanced rotation and thus undesirable vibrations. These vibrations traditionally result in bending or torsional forces within and along the length of the respective propshaft. Such bending or torsional forces as a result of the unbalanced rotation are neither desirable nor suitable in the operation of the driveline systems of most vehicles.

Accordingly, various dynamic dampers or mass dampers are utilized to suppress the undesirable vibrations that are induced in the rotary propshaft as a result of the natural frequencies of the propshaft amplifying input vibrations from the engine or other driveline components, such as gears, bearings, etc. These dampers are often installed or inserted directly onto or into the propshaft. The dampers are designed to generate a prescribed vibrational frequency and damping adjusted to the dominant frequency of the undesired vibrations. The damper converts or transfers the vibrational energy of the propshaft to the damper by resonance with the addition of an additional degree of freedom, and eventually absorbs the vibrational energy of the propshaft. Therefore, the damper attempts to cancel or negate (by splitting the resonance into two smaller resonances) the vibrations that are induced onto or caused by the rotary propshaft in normal operation of the driveline system of the vehicle.

Many dampers generally include a mass member disposed between a pair of ring-shaped fixing members and a pair of connecting members. The connecting members connect the ends of the fixing members to the mass members. However, many of these traditional dampers are not easily tunable to specific frequencies and have difficulty controlling the frequency for which the tuned absorber has been specifically designed to resonate without extensive redesign of the damper and the propshaft for each automotive vehicle driveline system. Further, many traditional dampers are developed for installation directly into the rotary propshaft. However, some these dampers are not capable of maintaining their alignment and become eccentric producing an undesirable vibration due to imbalance.

A typical energy absorber for insertion within a propshaft may include materials with temperature dependent properties. These materials include rubber, where the frequency and damping rate of the rubber changes with temperature changes. An example of such a prior art absorber is shown in FIG. 1. FIG. 1 illustrates a rear propshaft 54 with a prior art absorber 270. The absorber 270 includes a rubber portion 272 coupled to an inner propshaft surface 64, and an absorber mass 274. The rubber portion 272 is generally annular in shape while the absorber mass 274 is generally cylindrical. During rotation of the propshaft the rubber portion 272 operates to dampen vibrations. However, as stated above, the frequency and damping rate of the rubber changes with temperature changes. And a change in these properties will change the tuning of the absorber, which will, in turn, potentially deteriorate the effectiveness of its bases.

Therefore, there is a need in the art for an improved internal absorber. There also is a need in the art for an internal absorber that is simple to install and modify to match specific frequencies and dampening levels of various vehicle driveline systems, as well as an absorber that is temperature independent.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

FIG. 4A is an enlarged view of an alternative embodiment of a portion of the absorber depicted in encircled area 4A of FIG. 4, with a shaft wall removed for clarity.

DETAILED DESCRIPTION

Figure 1:
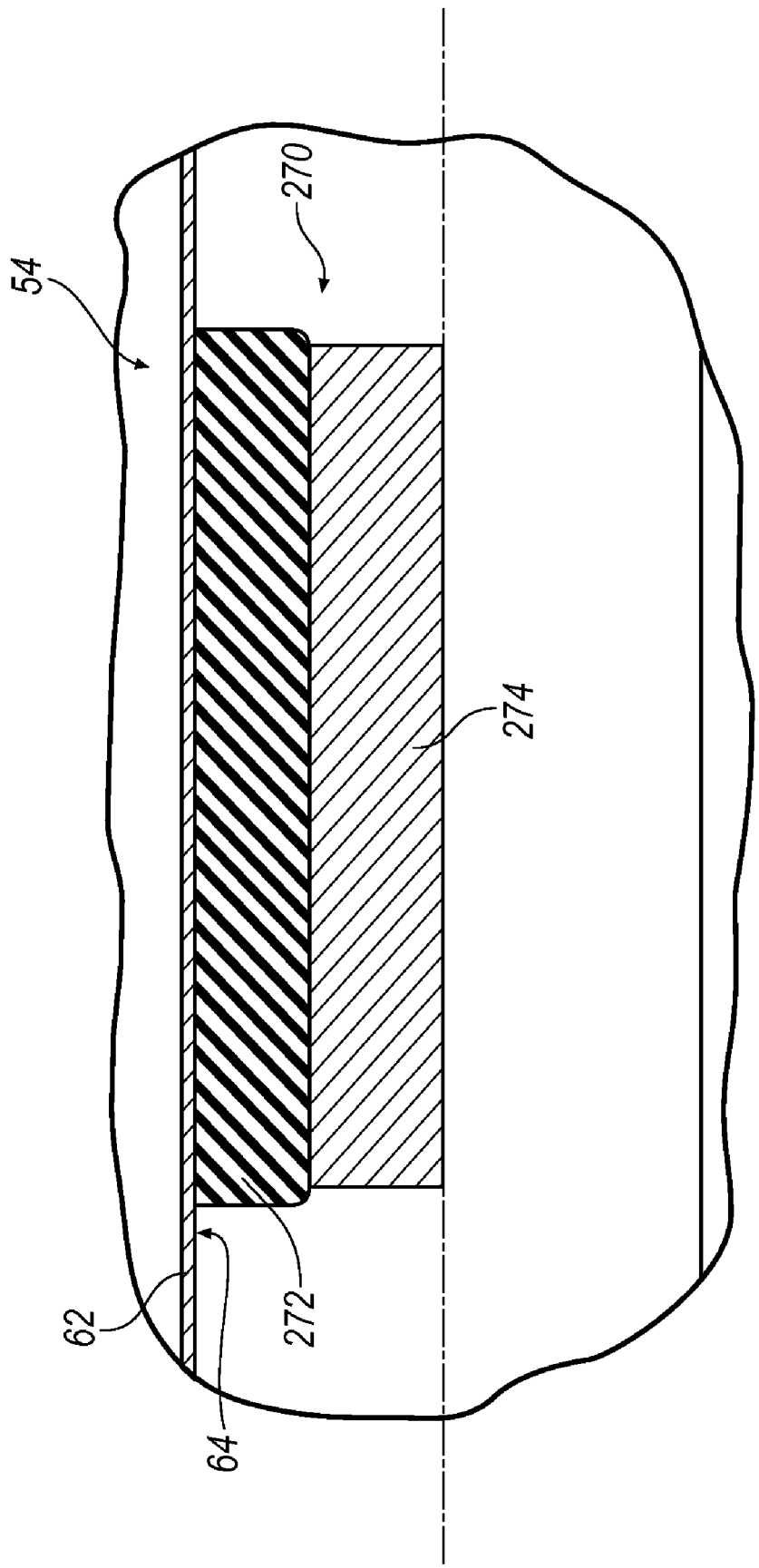
FIG. 1 is a prior art absorber.

Although the drawings represent some embodiments, the drawings are not necessarily to scale and certain features may be exaggerated, removed, or partially sectioned to better illustrate and explain the present disclosure. Further, the embodiments set forth herein are exemplary and are not intended to be exhaustive or otherwise limit or restrict the claims to the precise forms and configurations shown in the drawings and disclosed in the following detailed description.

Figure 2:
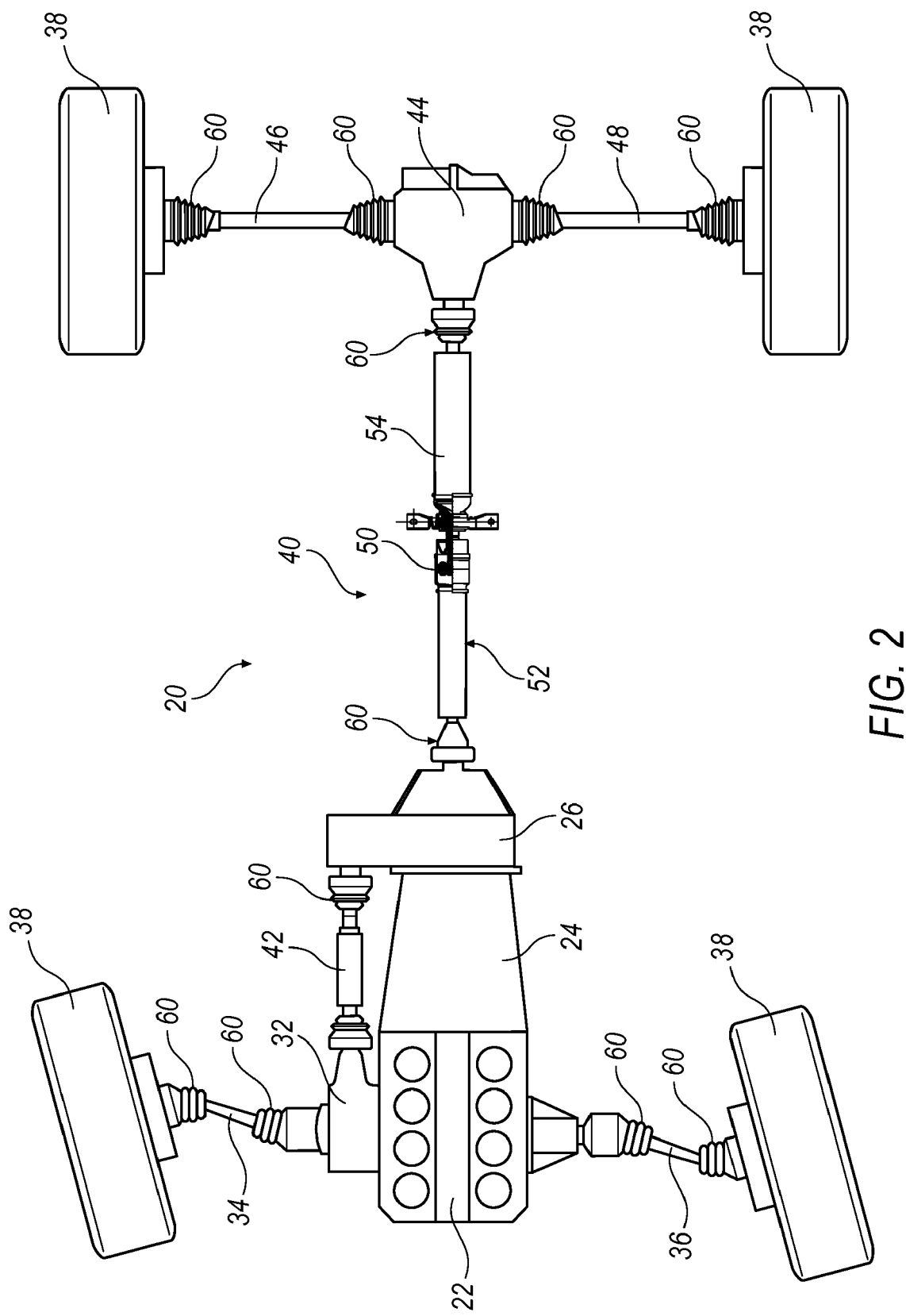
FIG. 2 is a top view of an exemplary driveline system.

FIG. 2 illustrates an exemplary driveline 20 of a vehicle (not shown). The driveline 20 includes an engine 22 that is connected to a transmission 24 and a power take off unit 26. A front differential 32 has a right hand front half shaft 34 and a left hand front half shaft 36, each of which are connected to a wheel 38 and deliver power to those wheels 38. The power take off unit 26 has a propeller shaft 40 and a front wheel propeller shaft 42 extending therefrom. The front wheel propeller shaft 42 connects the front differential 32 to the power take off unit 26. The propeller shaft 40 connects the power take off unit 26 to a rear differential 44, wherein the rear differential 44 includes a rear right hand side shaft 46 and a rear left hand side shaft 48, each of which ends with a wheel 38 on one end thereof.

Figure 3:
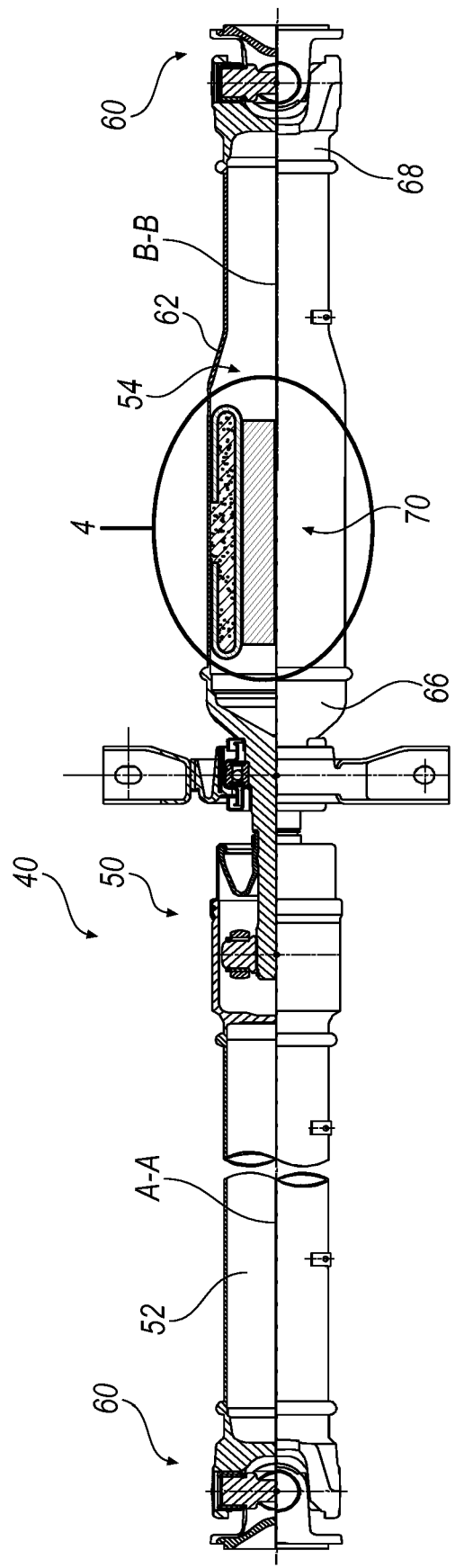
FIG. 3 is a partial sectional view of a propshaft illustrated in FIG. 2.

The propeller shaft 40, as best seen in FIG. 3, includes an articulated tripode joint 50, a front propshaft 52, a rear propshaft 54, and two high speed constant velocity joints 60. The front propshaft 52 is defined by an axis A-A, and the rear propshaft 54 is defined by an axis B-B. The constant velocity joints transmit power to the wheels 38 through the driveshaft 40 even if the wheels or the shaft have changing angles due to steering and suspension jounce and rebound. A constant velocity joint 60 is located on both ends of the half shafts that connect to the wheel 38 and the rear differential 44. On both ends of the right hand front half shaft 34 and left hand front half shaft 36 are constant velocity joints 60. In the embodiment illustrated, the rear propshaft 54 includes a generally cylindrical tubular wall 62 (best seen in FIGS. 4-6) having an inside propshaft surface 64, a first end 66, and a second end 68.

The constant velocity joints 60 may be of any of the standard types known, such as plunging tripod, cross groove joint, fixed ball joint, fixed tripod joint, or double offset joints, all of which are commonly known terms in the art for different varieties of constant velocity joints. The constant velocity joints 60 allow for transmission of constant velocities at angles which are found in everyday driving of automotive vehicles in both the half shafts and propshafts of these vehicles.

The driveline 20 represents an all wheel drive vehicle, however it should be noted that the embodiment of the constant velocity joints 60 of the current disclosure can also be used in rear wheel drive vehicles, front wheel drive vehicles, all wheel drive vehicles and four wheel drive vehicles.

Figure 4:
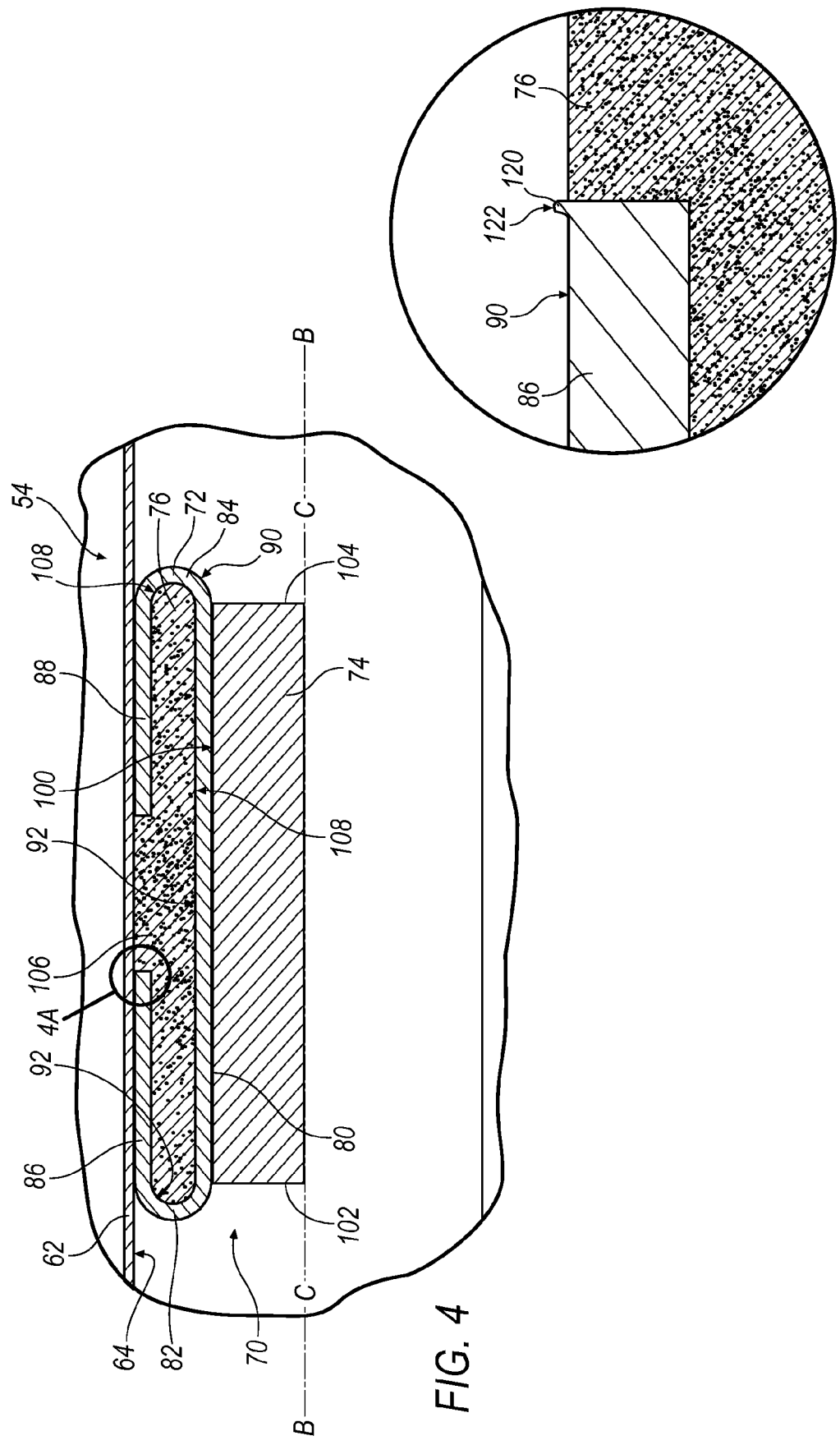
FIG. 4 is an enlarged partial sectional view of encircled area 4 of an embodiment of an absorber disposed within the propshaft of FIG. 3.

As best seen in FIG. 4, the rear propshaft 54 includes an absorber assembly, or damper assembly 70. The absorber assembly 70 includes spring portion 72 coupled to the inner propshaft surface 64, an absorber mass 74, and a damping portion 76 interposed within the spring portion 72. In one exemplary embodiment, the spring portion 72 is generally toroidal in shape while the absorber mass 74 is generally cylindrical, although other appropriate shapes may be used.

Indeed, the profile of the spring portion 72 may be changed to alter the frequency of the absorber assembly 70. In one exemplary embodiment, the spring portion 72 is constructed of spring steel. Spring steel ages better over time than rubber absorbers, thereby maintaining a consistent frequency. Further, unlike rubber absorbers, spring steel is temperature independent, such that changing damping and frequency rates caused by temperature changes may be eliminated or reduced. However, it is also understood that suitable materials other than spring steel may also be used.

In one exemplary embodiment, the damping portion 76 is constructed of a heavily damped foam and/or a closed cell foam.

In the exemplary embodiment illustrated, the spring portion 72 includes a generally cylindrical inside spring portion 80, a generally hemi-toroidal first end portion 82, a generally hemi-toroidal second end portion 84, a first outer connection portion 86, a second outer connection portion 88, an outer surface 90, and an inner surface 92. The absorber mass 74 includes a generally cylindrical outer surface 100, a first end 102, and a second end 104 and is generally defined by an axis C-C. As illustrated in a resting state in FIG. 4, the axis B-B is generally co-axial with the axis C-C. The damping portion 76, in the exemplary embodiment illustrated, includes a body 106 having an outer surface 108 that generally conforms to the spring inner surface 92.

The outer surface 90 of the connection portions 86, 88 are in contact with the inner propshaft surface 64, but not necessarily adhered thereto. The outer surface 90 of the inside spring portion 80 is coupled to at least a portion of the outer surface 100 of the absorber mass 74 to prevent relative movement therebetween. As discussed in greater detail below, the absorber assembly 70 is tuned for a desired frequency, such as 80 hertz (Hz), where the spring portion 72 is excited at this frequency.

FIG. 4A illustrates an embodiment of an exemplary connection portion 86 in greater detail. The connection portion 86 may include a barb 120 extending from the surface 90 away from the axis C-C. The barb 120 includes an end portion 122 that interferes with the inside propshaft surface 64 (FIG. 4) as the absorber assembly 70 is positioned within the rear propshaft 54. This interference may restrain the absorber assembly 70 from moving axially within the rear propshaft 54.

In one embodiment of manufacturing the absorber 70 of FIG. 4, a frequency is selected, such as the bending frequency of the propshaft 54. Then, the spring portion 72 is designed to excite at the selected frequency. That is, the materials and dimensions of the spring portion 72 are tailored to produce a spring portion with the resonant frequency that is about the same as the selected frequency. The damping portion 76 is then interposed within the spring portion 72 either before, during, or after the forming of the spring portion 72. The spring portion 72 is coupled to the absorber mass 74, such as by bonding. The bonding may include welding, adhesives, or other desired processes. The absorber assembly 70 is then interposed within a propshaft.

Figures 5, 5A:
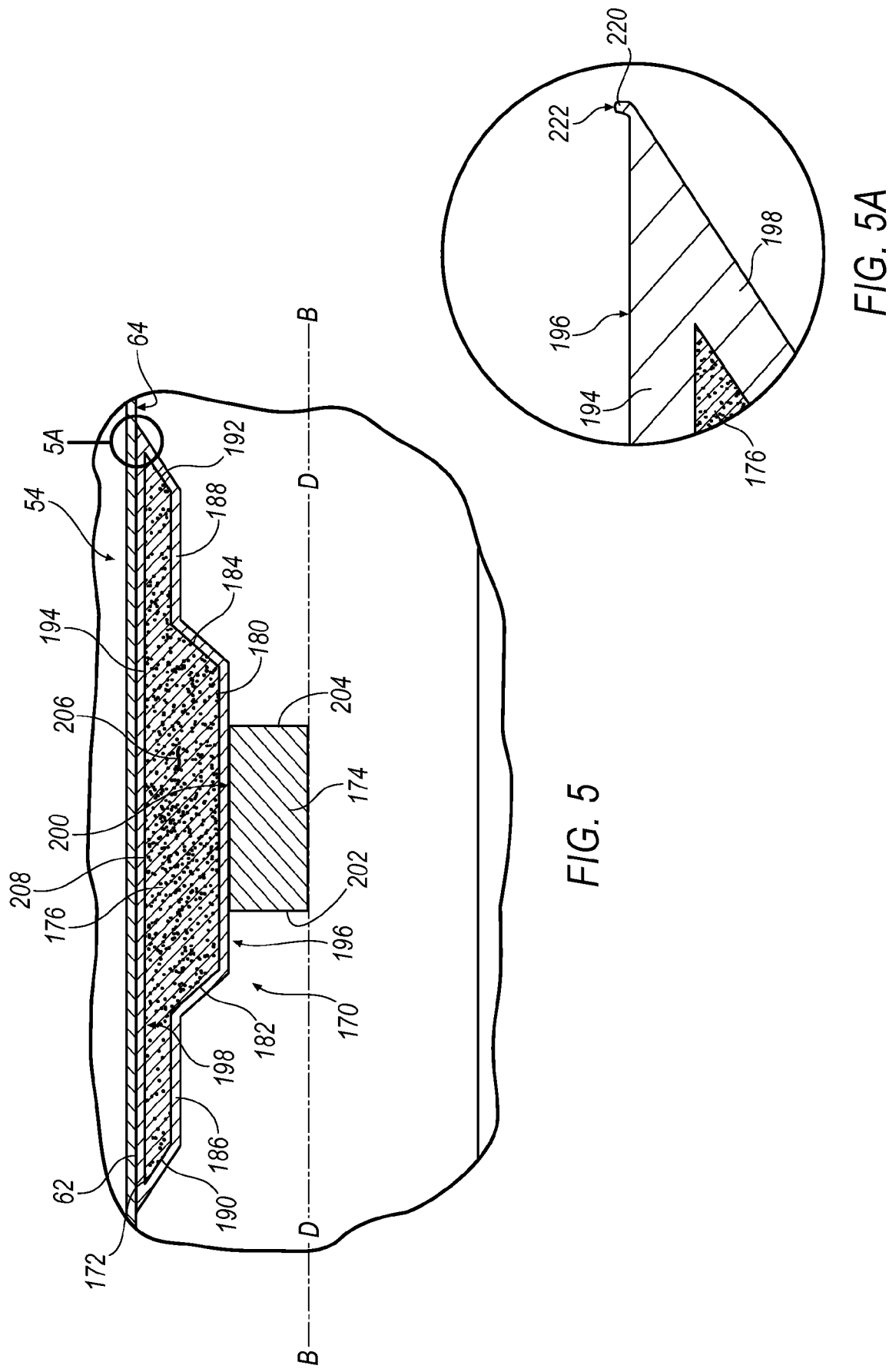
FIG. 5 is an enlarged partial sectional view of an alternative embodiment of encircled area 4 of an embodiment of an absorber disposed within the propshaft of FIG. 3.
FIG. 5A is an enlarged view of an alternative embodiment of a portion of the absorber depicted in encircle area 5A of FIG. 5, with a shaft wall removed for clarity.

FIG. 5 illustrates the rear propshaft 54 with an alternative embodiment of the absorber assembly 70 as an absorber assembly 170. The absorber assembly 170 includes a spring portion 172 coupled to the inner propshaft surface 64, an absorber mass 174, and a damping portion 176 interposed within the spring portion 172. In the embodiment illustrated, the absorber mass 174 is generally cylindrical, although other appropriate shapes may be used. Further, in the embodiment illustrated, the spring portion 172 is constructed of a temperature independent material, such as spring steel, although other suitable materials may be used. In one exemplary embodiment, the damping portion 176 is constructed of a heavily damped foam and/or a closed cell foam.

In the exemplary embodiment illustrated, the spring portion 172 includes a generally cylindrical inside spring portion 180, a generally frusto-conical first transition portion 182, a generally frusto-conical second transition portion 184, a generally cylindrical first intermediate portion 186, a generally cylindrical second intermediate portion 188, a generally frusto-conical first end portion 190, a generally frusto-conical second end portion 192, an outer connection portion 194, an outer surface 196, and an inner surface 198. The absorber mass 174 includes a generally cylindrical outer surface 200, a first end 202, and a second end 204 and is generally defined by an axis D-D. As illustrated in a resting state in FIG. 3, the axis B-B is generally co-axial with the axis D-D. The damping portion 176, in the exemplary embodiment illustrated, includes a body 206 having an outer surface 208 that generally conforms to the spring inner surface 198. As illustrated, the damping portion 176 is encased within the spring portion 172 and the propshaft 54, although the damping portions may not be encased.

The outer surface 196 of the outer connection portion 194 is in contact with the inner propshaft surface 64, but not necessarily adhered thereto. The outer surface 196 of the inside spring portion 180 is coupled to at least a portion of the outer surface 200 of the absorber mass 174 to prevent relative movement therebetween. As discussed in greater detail below, the absorber 170 is tuned for a plurality of desired frequencies, such as 80 Hz and 100 Hz, where the spring portion 172 is excited at these frequencies. In one embodiment, the spring portion 172 is a dual rate spring.

FIG. 5A illustrates an embodiment of an outer connection portion 194 in greater detail. The outer connection portion 194 may include a barb 220 extending from the surface 196 away from the axis D-D. The barb 220 includes an end portion 222 that interferes with the inside propshaft surface 64 (FIG. 3) as the absorber assembly 170 is positioned within the rear propshaft 54. This interference may restrain or inhibit the absorber assembly 170 from moving axially within the rear propshaft 54.

In the embodiments illustrated, the absorber assemblies 70, 170 are depicted as being positioned in a rear propshaft 54. However, it is also contemplated that the absorber assemblies may be placed inside any propshaft.

Figure 6:
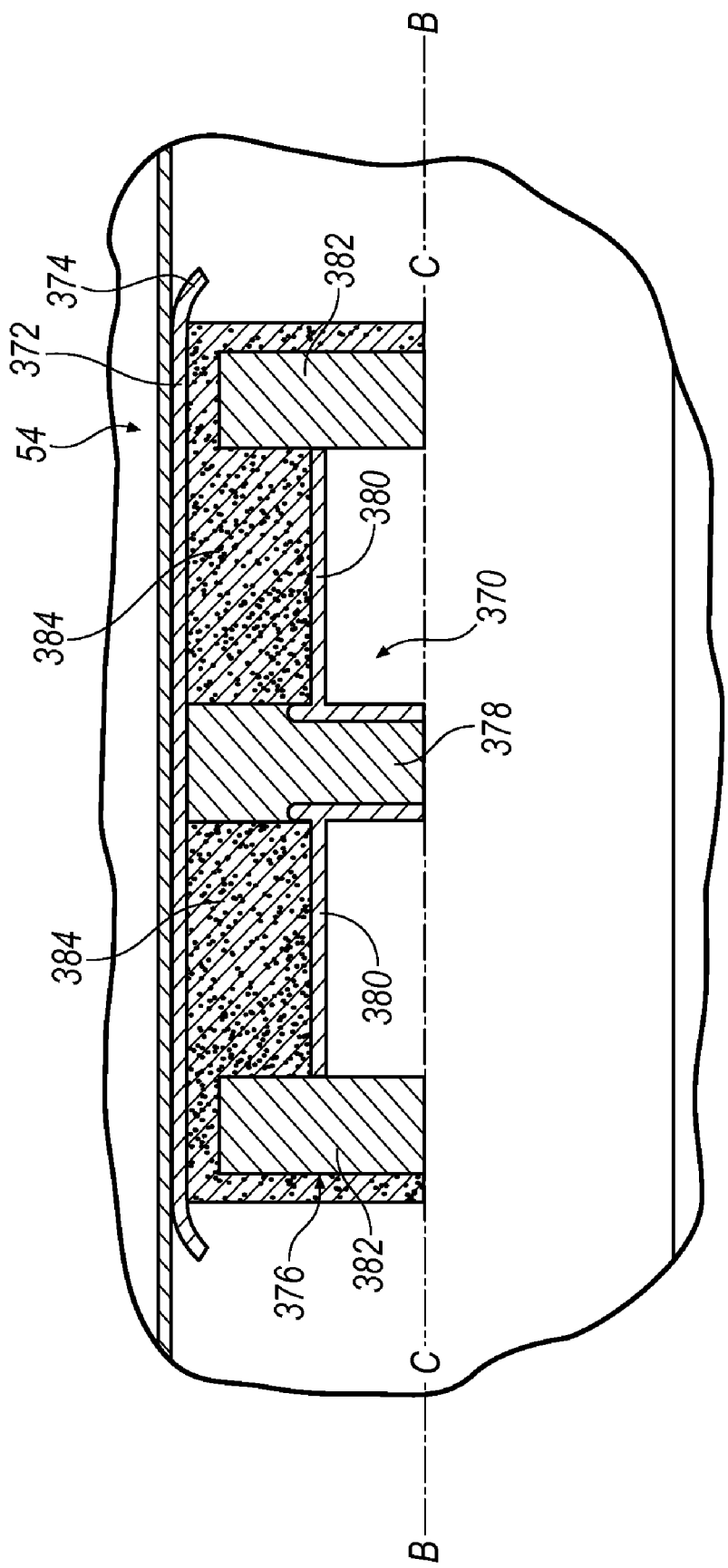
FIG. 6 is an enlarged partial sectional view of an alternative embodiment of encircled area 4 of an embodiment of an absorber disposed within the propshaft of FIG. 3.

FIG. 6 illustrates the rear propshaft 54 with another alternative embodiment of the absorber as an absorber assembly 370. The absorber assembly 370 includes a tube 372 having a predetermined length and a predetermined diameter so as to fit within propshaft 54. In one exemplary embodiment, the tube 372 may be configured with reduced diameter ends 374 that form a ramp-like surface for simple insertion of the absorber assembly 370 within the interior of propshaft 54.

Arranged within the tube 372 is a cantilever device 376 that includes a base 378, at least one cantilever tube 380, and at least one mass member 382. A damping material 384 is also disposed within tube 372.

In one particular embodiment, the base 378 of the cantilever device 376 is positioned approximately at a mid-point of the tube 372. The base 378 may be configured with a generally disk-like shape with an orifice arranged on each end thereof into which the cantilever tube 380 may be secured. As may be seen in FIG. 6, in one particular embodiment, a cantilever tube 380 is secured on either side of the base 378. The cantilever tubes 380 are configured with a predetermined length and diameter.

The mass member 382 is secured on an end of the cantilever tube 380, opposite the base 378. For those embodiments, which have a pair of cantilever tubes 380, a mass member 382 is secured to each cantilever tube 380. During operation, the mass members 382 will move within the tube radially and negate the vibrational frequencies of the propshaft. The cantilever device 376 will be tuned to a predetermined frequency by adjusting the length of the cantilever tubes 380, by adjusting the diameter of the cantilever tubes 380, or by adjusting the weight of the mass members 382. In one particular embodiment, the cantilever tubes 380 and/or mass members 382 are constructed of a temperature independent material such that temperature does not modify the absorber assembly 370 during its life.

The damping material 384 is disposed within the tube 372 such that it surrounds cantilever tubes 380 and mass members 382. In one exemplary embodiment, damping material 384 substantially fills tube 372 such that the damping material 384 contacts an inside surface of the tube 372, and contacts the base 378, cantilever tubes 380 and the mass members 382. In one exemplary embodiment, the damping material 384 is constructed of a damping material, such as a heavily damped foam and/or a closed cell foam.

Figure 7:
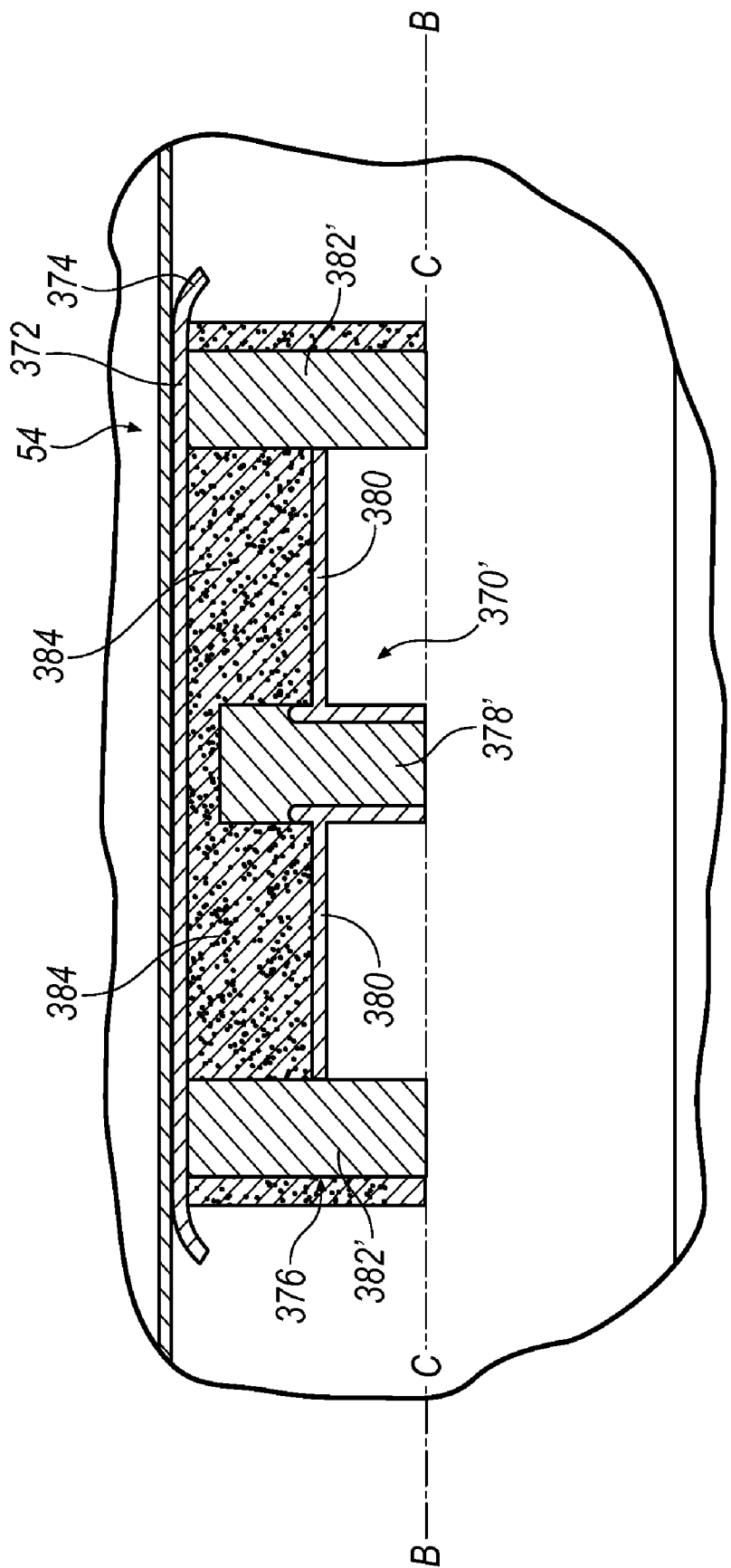
FIG. 7 is an enlarged partial sectional view of an alternative embodiment of the absorber of FIG. 6.

Referring to FIG. 7, an alternative embodiment of the absorber as an absorber assembly 370' is shown. The absorber assembly 370' is similar to absorber assembly 370 in that it also includes a tube 372, a cantilever device 376', and damping material 384. Cantilever device 376' includes a base 378', at least one cantilever tube 380, and at least one mass member 382'. However, in this embodiment, mass members 382' are configured with a length that is longer than the length of the base 378'.

During operation of the absorber assembly 70, the propshaft 54 will produce a relatively high magnitude of vibrational energy at the selected frequency (bending frequency). The absorber assembly 70 will respond to this energy by transmitting this energy to the absorber mass 74. The absorber mass 74 will resonate at about this frequency and essentially "absorb" the energy as the energy is dissipated. Similarly, the absorber assemblies 170, 370 and 370' are tuned to resonate at a plurality of selected frequencies, where vibrational energy at these frequencies is dissipated by the absorber mass 174, or mass members 382 and 382'.

Figure 8:
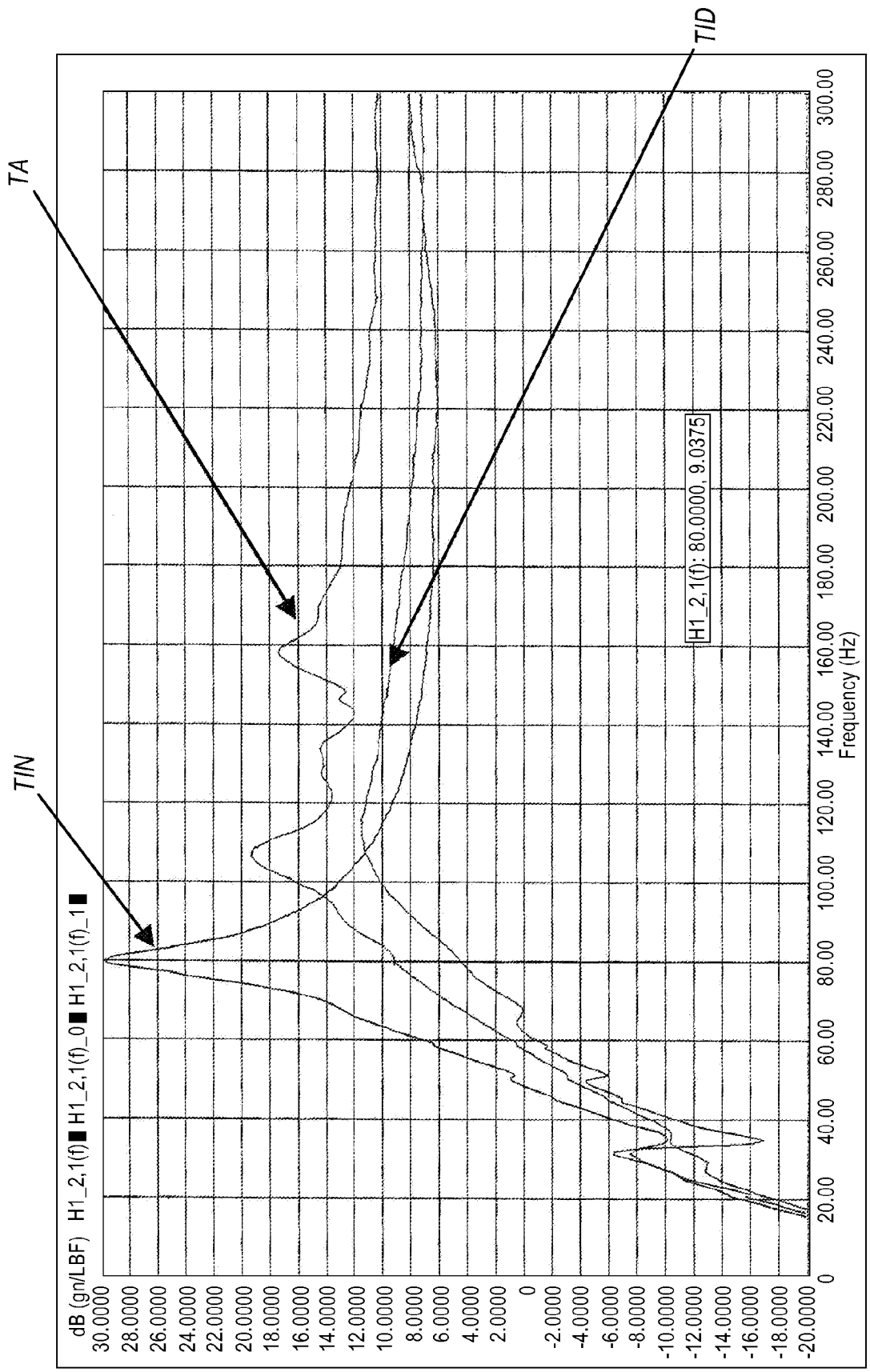
FIG. 8 is a graphical representation of measurements taken from a vibration test of an exemplary device.
Figure 9:
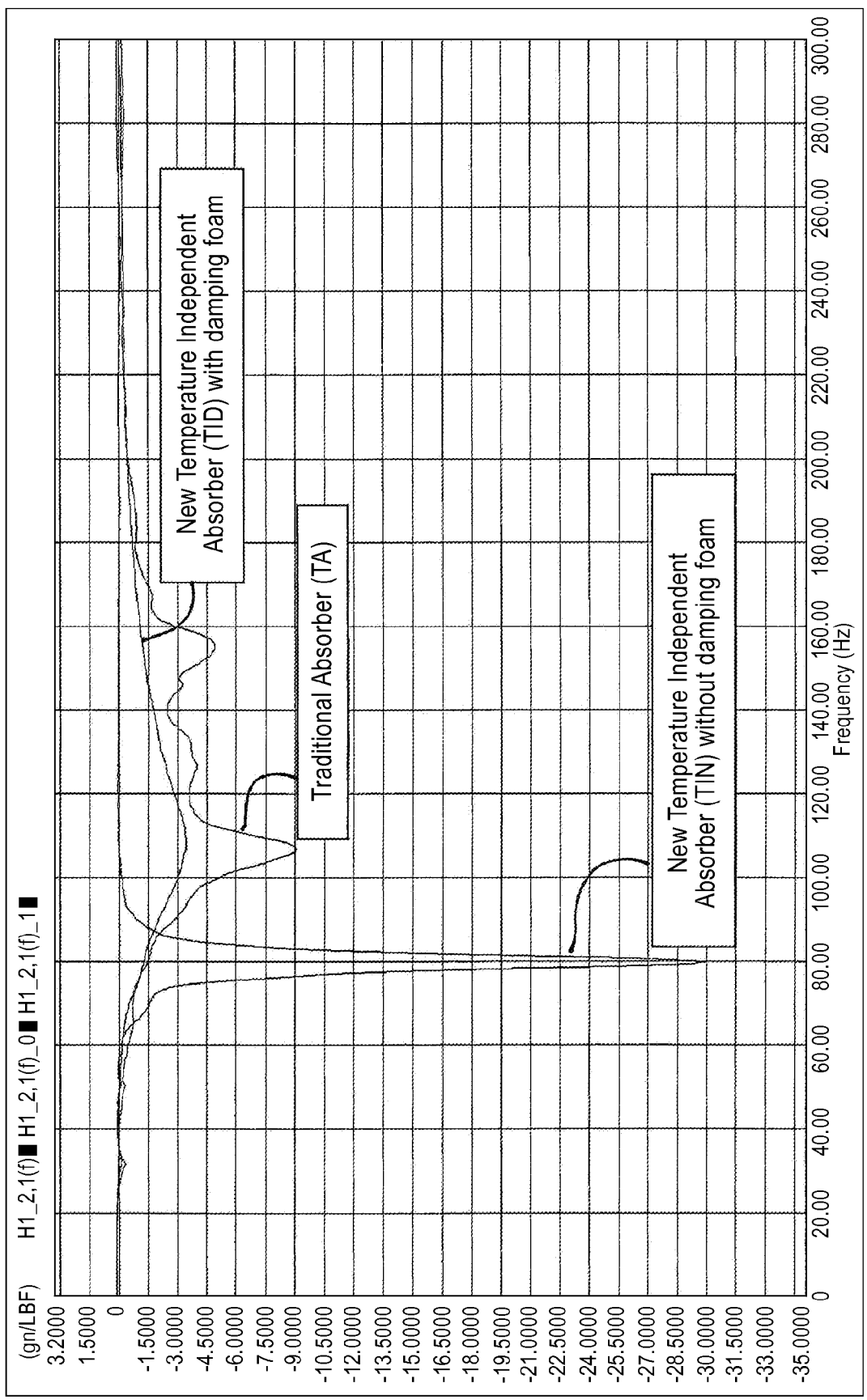
FIG. 9 is a graphical representation of measurements taken from a vibration test of an exemplary device.

FIGS. 8 and 9 illustrate graphical representations of the response of three propshafts with absorbers interposed therein. The x-axes of the graphical representations are frequency of the shaft assembly measured in Hertz, while the y-axes are incremented in units of acceleration/force for comparative purposes. These graphical representations are well-understood by one skilled in the art as traditional measures of the effectiveness of absorbers used in driveshaft assemblies. Specifically in FIGS. 8 and 9, Curve TA represents measurements of a traditional absorber, such as the rubber-based absorber of FIG. 1. Curve TIN represents measurements of an undamped absorber, such as the absorber 70 in FIG. 4 with the damping portion 76 removed. Curve TID represents an absorber, such as the absorber 70 in FIG. 4 that includes the damping portion 76. As illustrated, the absorber 70 with damping portion 76 reduced peak excitations when compared to operation of the traditional absorber.

As illustrated herein, the dampers may be coupled to any driveline member, such as a prop shaft tubular wall or end piece. While attenuating includes lessening the amount, force, magnitude, or value, the resonator, in one non-limiting embodiment may reduce the magnitude of vibrational energy, and/or may transform a resonant resonate vibration to a different frequency to avoid the operation of a driveline member at an undesired frequency.

The shape and materials of the absorbers 70, 170 may vary, while the intent of forming a spring portion with a temperature insensitive resonate frequency is not significantly altered. In one example, the resonant frequency of a traditional absorber, such as the absorber 270 may change from 140 Hz at about 0 degrees Fahrenheit (0 F.) to about 80 Hz at about 200° F.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A shaft assembly, comprising:
    a shaft member having an inside surface and defined by an axis;
    an absorber mass interposed within the shaft member;
    a generally annular spring portion interposed between the absorber mass and the shaft member, wherein the spring portion is a dual rate spring; and
    a damping portion interposed within the spring portion, wherein the spring portion is configured radially outward of the absorber mass, such that the annular spring separates the absorber mass from the damping portion.

2. The shaft assembly of claim 1, wherein the spring portion is constructed of metal.

3. The shaft assembly of claim 1, wherein the spring portion is constructed of a temperature independent material.

4. The shaft assembly of claim 1, wherein the damping portion is constructed of foam.

5. The shaft assembly of claim 1, wherein the damping portion is of a closed cell foam.

6. The shaft assembly of claim 1, wherein the spring portion is defined by a generally toroidal outer surface.

7. The shaft assembly of claim 1, wherein the spring portion is defined by first and second frusto-conical portions.

8. The shaft assembly of claim 1, wherein the spring portion is defined by an outer periphery that is closed off.

9. The shaft assembly of claim 8, wherein the damping portion is encased within the spring portion.

10. The shaft assembly of claim 1, wherein the absorber mass is fixed to the spring portion.

11. The shaft assembly of claim 1, wherein a section of the spring portion is in contact with the inside surface of the shaft member.

12. The shaft assembly of claim 1, wherein the spring portion includes a connection portion that further comprises at least one barb that extends from a surface of the connection portion, away from the axis.

13. A shaft assembly, comprising:
    a shaft member having an inside surface and defined by an axis;
    an absorber assembly generally disposed within the shaft member, wherein the absorber assembly further comprises:
    a cantilever device including a base, at least one cantilever tube defined by a first end and a second end, a mass member and a damping portion constructed of a damping material;
    wherein the first end of the cantilever tube is connected to the base and the second end of the cantilever tube is connected to the mass member such that the mass member is spaced away from the base; and
    wherein the damping material is disposed around the cantilever device extending between an outer surface of the cantilever tube and an elongated tube disposed within the shaft member.

14. The shaft assembly of claim 13, wherein the tube surrounds the cantilever device.

15. The shaft assembly of claim 14, wherein the damping material substantially fills the elongated tube.

16. The shaft assembly of claim 13, wherein the cantilever tube is a temperature independent material.

17. The shaft assembly of claim 13, wherein the damping material is foam.

* * * * *